US008379671B2

(12) United States Patent
Chen et al.

(10) Patent No.: US 8,379,671 B2
(45) Date of Patent: Feb. 19, 2013

(54) TECHNIQUES FOR EXTRACTING A CONTROL CHANNEL FROM A RECEIVED SIGNAL IN A WIRELESS COMMUNICATION SYSTEM

(75) Inventors: Ning Chen, Austin, TX (US); Pornchai Pawawongsak, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1053 days.

(21) Appl. No.: 12/363,634

(22) Filed: Jan. 30, 2009

(65) Prior Publication Data

US 2010/0197302 A1  Aug. 5, 2010

(51) Int. Cl.
*H04J 3/24* (2006.01)
(52) U.S. Cl. ......................................... 370/474
(58) Field of Classification Search ........................ None
See application file for complete search history.

(56) References Cited

U.S. PATENT DOCUMENTS

| 4,380,071 | A  | * | 4/1983 | Odaka ............................ 714/758 |
| 6,748,561 | B2 |   | 6/2004 | Prasad |
| 6,965,557 | B2 |   | 11/2005 | Kim |
| 7,386,766 | B2 |   | 6/2008 | Gao et al. |
| 2008/0259856 | A1 | * | 10/2008 | Frederiksen et al. .......... 370/329 |
| 2010/0303028 | A1 | * | 12/2010 | Gresset et al. ................ 370/329 |

* cited by examiner

*Primary Examiner* — Kwang B Yao
*Assistant Examiner* — Tung Q Tran
(74) *Attorney, Agent, or Firm* — Yudell Isidore Ng Russell PLLC

(57) ABSTRACT

A technique for extracting a control channel from a received signal includes storing interleaved control channel elements of the received signal in a control channel region of a memory. First addresses for first elements that are included in a first control channel are then generated using a first circuit. Finally, the respective first elements are read, using a second circuit, from the control channel region of the memory according to the generated first addresses to provide the first control channel in a deinterleaved form.

17 Claims, 7 Drawing Sheets

US 8,379,671 B2

TECHNIQUES FOR EXTRACTING A CONTROL CHANNEL FROM A RECEIVED SIGNAL IN A WIRELESS COMMUNICATION SYSTEM

BACKGROUND

1. Field

This disclosure relates generally to a control channel and, more specifically, to techniques for extracting a control channel from a received signal in a wireless communication system.

2. Related Art

Wireless networks that employ third-generation partnership project long-term evolution (3GPP-LTE) compliant architectures are required to employ uplink reference signals (RSs) for uplink carrier-to-interference and noise ratio (CINR) estimation, which is used by the networks to schedule uplink transmissions for user equipment (subscriber stations (SSs)). Respective sequences of the RSs are used to uniquely identify an SS and, when transmitted from the SS to a serving base station (BS), may be used by the serving BS in channel characterization. In general, a scheduler associated with one or more serving BSs utilizes information derived from channel characterization to determine channel allocation for the SSs. The channel allocation, e.g., uplink and downlink assignments, have then been provided to the SSs over a downlink shared control channel, which typically includes one or more control channel symbols. The one or more control channel symbols may be transmitted by the serving BS at a beginning of a downlink frame (or subframe). Typically, upon receiving the one or more control channels symbols, each of the SSs searches the one or more control channel symbols to determine an associated uplink and downlink assignment.

Data is often transmitted with error correction bits that allow a receiver to correct a certain number of errors that occur during transmission. However, when a burst error occurs, more errors may be produced in a single codeword than can be corrected. For example, a burst error may overwrite multiple bits in a row and, as such, may overwhelm a typical error correction scheme that expects errors to be uniformly distributed. In this case, a received codeword cannot be correctly decoded. To reduce the effect of burst errors, bits of a number of codewords may be interleaved before being transmitted. When interleaving is employed, a burst error may be limited to only affecting a correctable number of bits in each codeword, such that a decoder can correctly decode the codewords. In general, interleaving is popular as it usually provides a less complex and lower cost approach to handling burst errors than directly increasing a complexity of an error correction scheme. However, interleaving techniques usually increase latency as an entire interleaved block must be received before received data can be deinterleaved and decoded.

A number of different data deinterleaving approaches are known. For example, U.S. Pat. No. 6,965,557 (assigned to LG Electronics Inc.) proposes specific logic to increase data access speed by improving addressing and access operation of an interleaved memory in a code division multiple access (CDMA) system. As another example, U.S. Pat. No. 6,748,561 (assigned to Sony Corporation) discloses reading and writing symbols in alternate sequences during interleaving/deinterleaving to reduce memory requirements (two buffers for each frame of symbols). In general, the approach multiplexes interleaving procedures for two consecutive frames and employs two buffers for each frame of symbols. As yet another example, U.S. Pat. No. 7,386,766 (assigned to Thomson Licensing), which is directed to a turbo encoder/decoder in a wideband-code division multiple access (W-CDMA) system, discloses alternating two frames to save memory, similar to U.S. Pat. No. 6,748,561.

In long-term evolution (LTE) compliant wireless communication systems, LTE physical downlink control channel (PDCCH) deinterleaving is an implementation issue that is vendor specific. A known deinterleaving approach for an LTE compliant wireless communication system has proposed reordering data samples in three steps using three read and three write operations of an entire control channel region of a memory.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
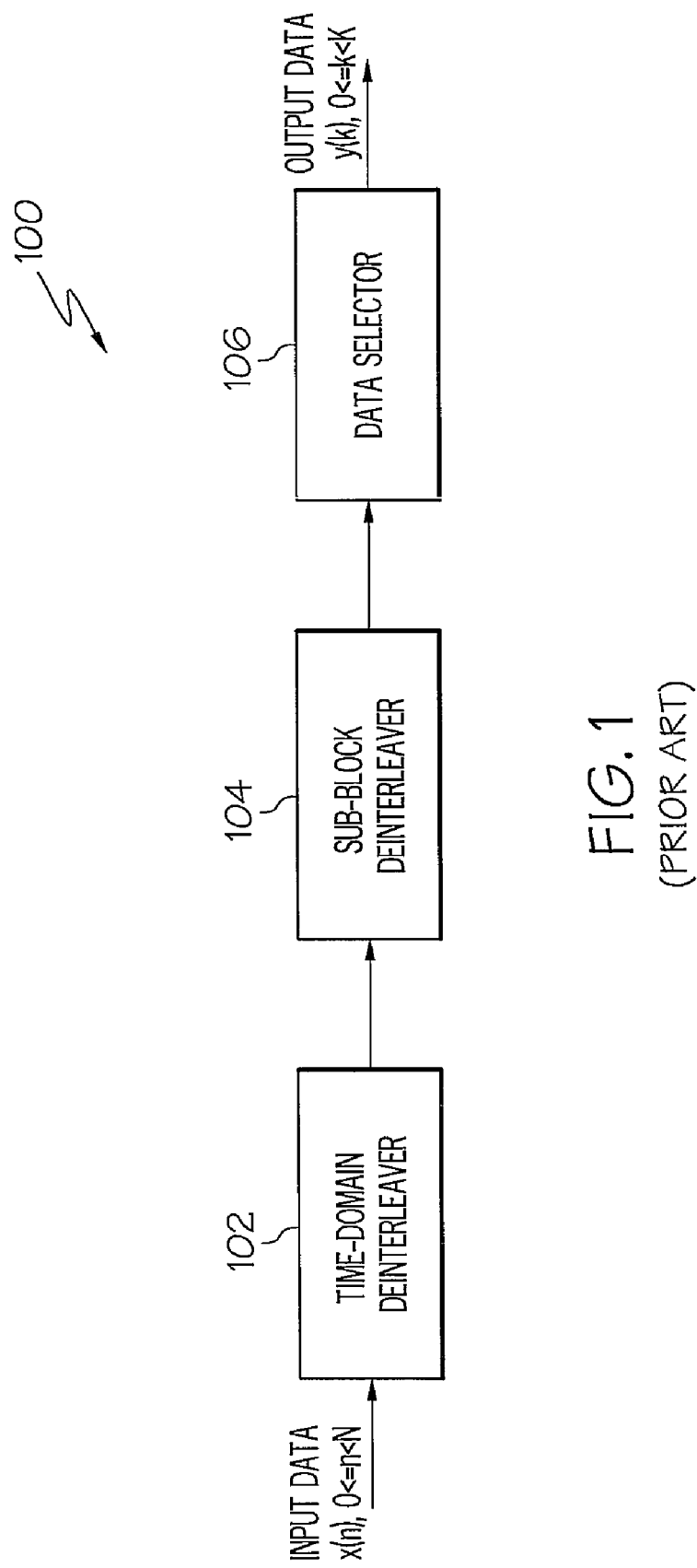
FIG. 1 is an example diagram of a relevant portion of a conventional deinterleaver for a long-term evolution (LTE) compliant wireless communication system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station, such as a cellular handset, it will be appreciated that the present invention is not so limited and may be embodied in various devices.

As may be used herein, the term "user equipment" is synonymous with the term "subscriber station," which is used to broadly denote a wireless device associated with a wireless communication system. As is used herein, the term "control channel symbol" includes a symbol that may occupy an entire system bandwidth or a portion of the entire system bandwidth. The term "channel," as used herein, includes one or more subcarriers, which may or may not be adjacent. As used herein, the term "coupled" includes a direct electrical connection between blocks or components and an indirect electrical connection between blocks or components achieved using one or more intervening blocks or components.

In the discussion herein, the variable 'aa' corresponds to an address. The variable 'N' is the total number of control channel elements (CCEs) transmitted in a control channel, where one CCE may contain a number of complex samples. The variable 'R' is the total number of rows defined for a control channel region (where R=ceil(N/32)). The variable 'r' is a row of a desired index (where r=floor((desired_index)/32)=n=(aa-base)/4/32) of a CCE that is included in a control channel. In the discussion herein, the number of columns of a matrix is assumed to be thirty-two (32) and the number of complex samples per CCE is assumed to be four (4). It should be appreciated that the techniques described herein may be readily extended to a matrix having more or less than thirty-two columns and CCEs having more or less than four complex samples. The variable 'i' is a column of the desired index of a CCE that is included in a control channel (where i=mod(desired_index,32)). The look-up table 'Q(i)' provides a corresponding column permutation index (e.g., Q(i)=[16 0 24 8 20 4 28 12 18 2 26 10 22 6 30 14 17 1 25 9 21 5 29 13 19 3 27 11 23 7 31 15]. The variable 'T' is the size of null padding required to ensure that sub-blocks in a control channel region fill an R by 32 matrix (where T=32−mod(N,32)). The look-up table 'f(i,T)' provides a constant that is utilized to compensate an output index due to padding.

In one embodiment, the disclosed techniques facilitate improved downlink control channel deinterleaving for an LTE compliant system. In an LTE compliant system, control channel elements (CCEs) of a downlink control channel are interleaved at a transmitter using a sub-block interleaver (to achieve frequency diversity) and a time-domain interleaver (to achieve time diversity). The downlink CCEs for multiple users are grouped into N CCEs (or quadruples). In sub-block interleaving an input sequence of N quadruples is (pseudo) randomly permuted as follows for an R (row) by 32 (column) matrix: insert T=32−mod(N,32) nulls to the beginning of an input sequence such that (N+T) is an integer multiple of 32; write the input sequence into the R by 32 sized matrix row-by-row; randomly permute the columns of the matrix following a predetermined random index sequence P(i), where i=0, 1, . . . , 31; and read the elements of the control channel column by column and skip the nulls.

As mentioned above, a known conventional deinterleaving approach reorders data samples in three steps that require three reads and three writes of an entire control channel region of a memory (i.e., a first write of the CCEs to the control channel region, a first read of the CCEs prior to sub-block deinterleaving, a second write of the CCEs to the control channel region after the sub-block deinterleaving, a second read of the CCEs prior to time-domain deinterleaving, a third write of the CCEs of an associated control channel to the control channel region after the time-domain deinterleaving and a third read of the CCEs of the associated control channel prior to processing of the associated control channel).

According to various embodiments of the present disclosure, deinterleaving may be accomplished with a single memory read and a single memory write, which generally reduces decoding latency and power consumption. While conventional approaches move data samples in three steps, the disclosed techniques employ a novel address generator to facilitate data selection, sub-block deinterleaving, and time-domain (TD) deinterleaving in a single step (i.e., including a single read and a single write of a control channel region of a memory). In general, the disclosed techniques facilitate efficient downlink control channel deinterleaving for an orthogonal frequency division multiplexing (OFDM) engine of an LTE compliant system. While the discussion herein focuses on LTE compliant systems, it is contemplated that the techniques disclosed herein are broadly applicable to deinterleaving data in a wide variety of systems.

As alluded to above, at a receiver, a deinterleaver is needed to reverse a random permutation of downlink CCEs. According to the present disclosure, LTE control channel deinterleaving is accomplished by separating data moving from addressing using an address generator that includes: an accumulator that self-increments a base address by n (e.g., 4) each cycle; offset calculation logic that includes two relatively small look-up tables (Q(c) and f(c,T)) that are indexed by an accumulator output and one multiple-add operator; bit shift left logic (left by 2 bits) that transforms a resource element group (REG) offset, e.g., 4 consecutive samples, into a sample offset; and an adder that adds the offset of the selected sample to a base address.

More specifically, according to the present disclosure, LTE control channel deinterleaving is accomplished by implementing an address generator that includes: sub-block deinterleaving logic that performs the function m=p(k)=n+Q(c)R−f(c,T), where n=floor((k+T)/32) is the row index, c=mod(k+T,32) is the column index, T=32−mod(N,32) is the size of null padding, N is the total number of resource element groups (REGs) or control channel elements (CCEs), R=ceiling(N/32) is the total number of rows, and k=0,1, . . . N−1 is the index of the desired sample; and time-domain (TD) deinterleaving logic that performs the function I=q(m)=(mod(m,CFI)>1)*n0+(mod(m,CFI)>2)*n1+floor(m/CFI), where I is the offset location of the $k^{th}$ desired sample, a control format indicator (CFI) provides the number of physical downlink control channel (PDCCH) symbols (e.g., 1, 2, or 3), and n0 and n1 are the number of REGs in the first and second symbols, respectively; offset shift left logic (shift left by two bits) which transforms REGs (4 consecutive samples) offset into a sample offset; and an adder that adds an offset of a selected sample to a base address. In general, the disclosed deinterleaving techniques facilitate programmable control of a desired output region (data selection) and are efficient as address generation is performed by an address generator that is relatively straight forward to implement and efficient.

With reference to FIG. 1, a relevant portion of a conventional deinterleaver 100 for a long-term evolution (LTE) compliant system is illustrated. As is shown, the deinterleaver 100 includes a time-domain deinterleaver 102, a sub-block deinterleaver 104, and data selector 106 that selects a control channel associated with a given SS from a control channel region of a memory following deinterleaving. The deinterleaver 102 initially reads input data from the control channel region of the memory and performs time-domain deinterleaving on the input data to deinterleave the input data in the time-domain. The time-domain deinterleaved data is then written back to the control channel region of the memory. The deinterleaver 104 then reads the time-domain deinterleaved data from the control channel region of the memory and performs sub-block deinterleaving (on the time-domain deinterleaved data) to provide data that is also sub-block deinterleaved. The sub-block deinterleaved data is then written to the control channel region of the memory. Finally, the data selector 106 reads an associated control channel from the sub-block deinterleaved data.

Figure 2:
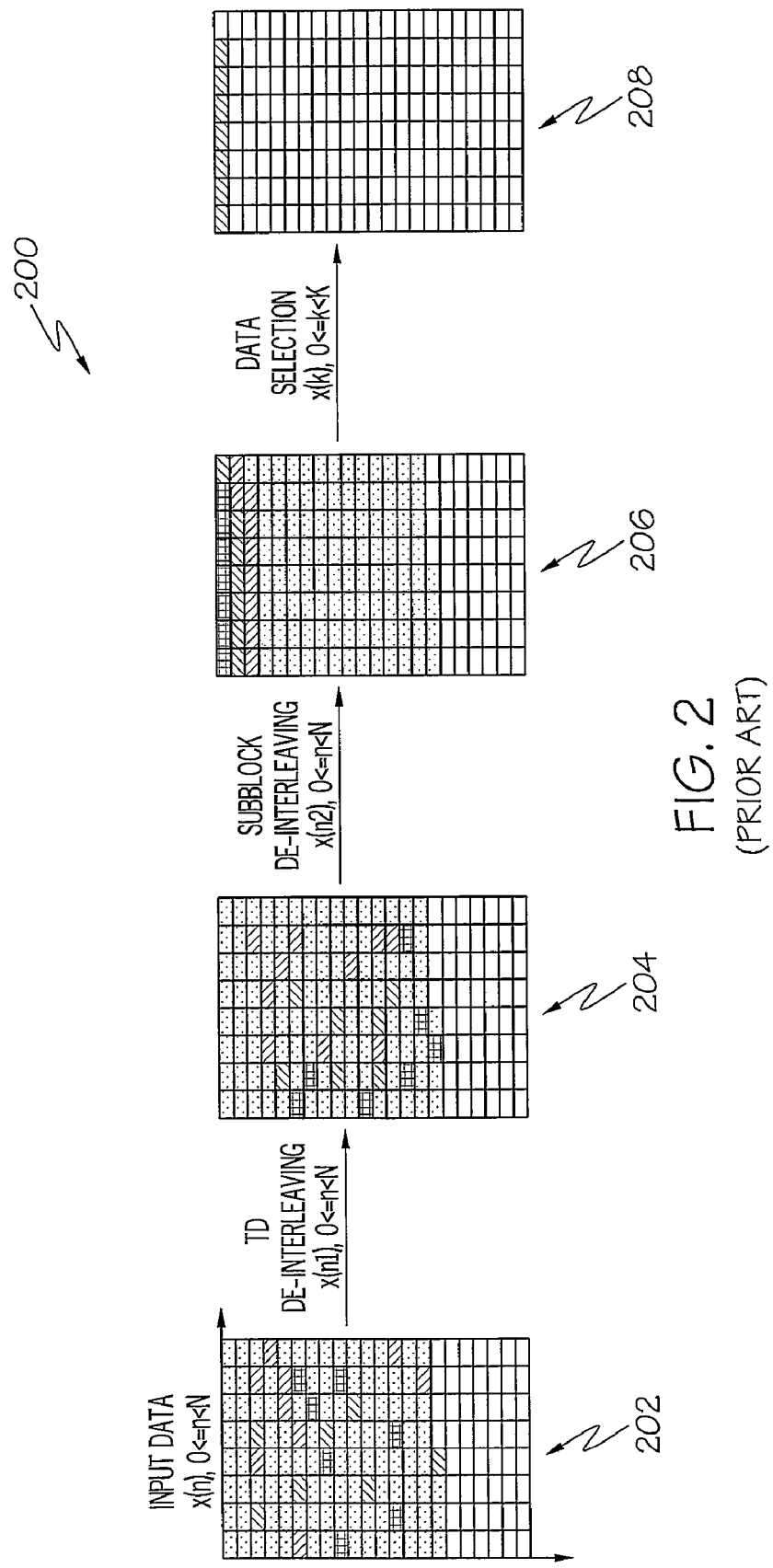
FIG. 2 is an example diagram that depicts deinterleaving by the conventional deinterleaver of FIG. 1, which reads and writes to a control channel region of a memory three times to deinterleave an associated control channel.

With reference to FIG. 2, a diagram 200 depicts a control channel region of a memory of the PDCCH during a conventional deinterleaving process. As is shown a time-domain deinterleaver receives input data 202 read from the memory and performs time-domain deinterleaving on the input data to deinterleave the input data in the time-domain. The time-domain deinterleaved data is then written back to the memory 204. A sub-block deinterleaver then receives the time-domain deinterleaved data read from the memory 204 and performs sub-block deinterleaving (on the time-domain deinterleaved data) to provide data that is also sub-block deinterleaved. The sub-block deinterleaved data is then written to the memory 206. Finally, a data selector selects an associated control channel to be read from the sub-block deinterleaved data 208.

Figure 3:
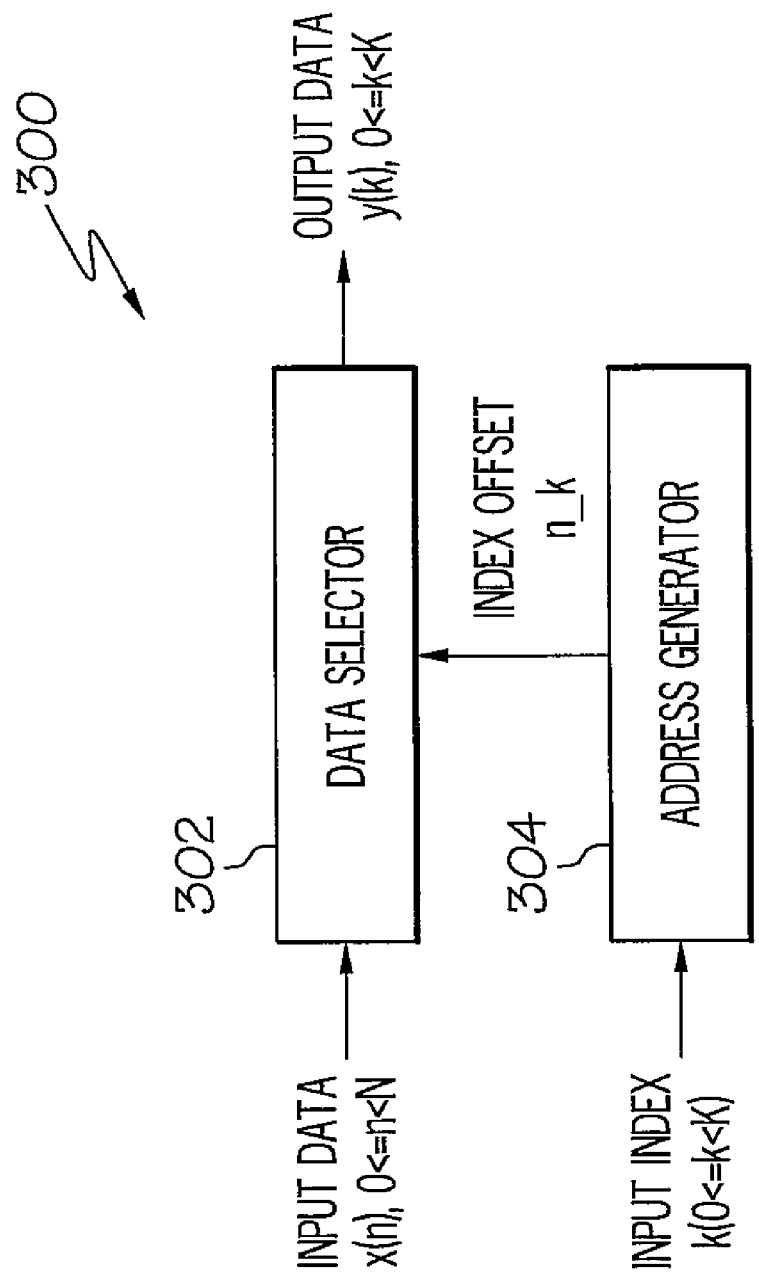
FIG. 3 is an example diagram of a relevant portion of a deinterleaver configured according to an embodiment of the present invention.
Figure 4:
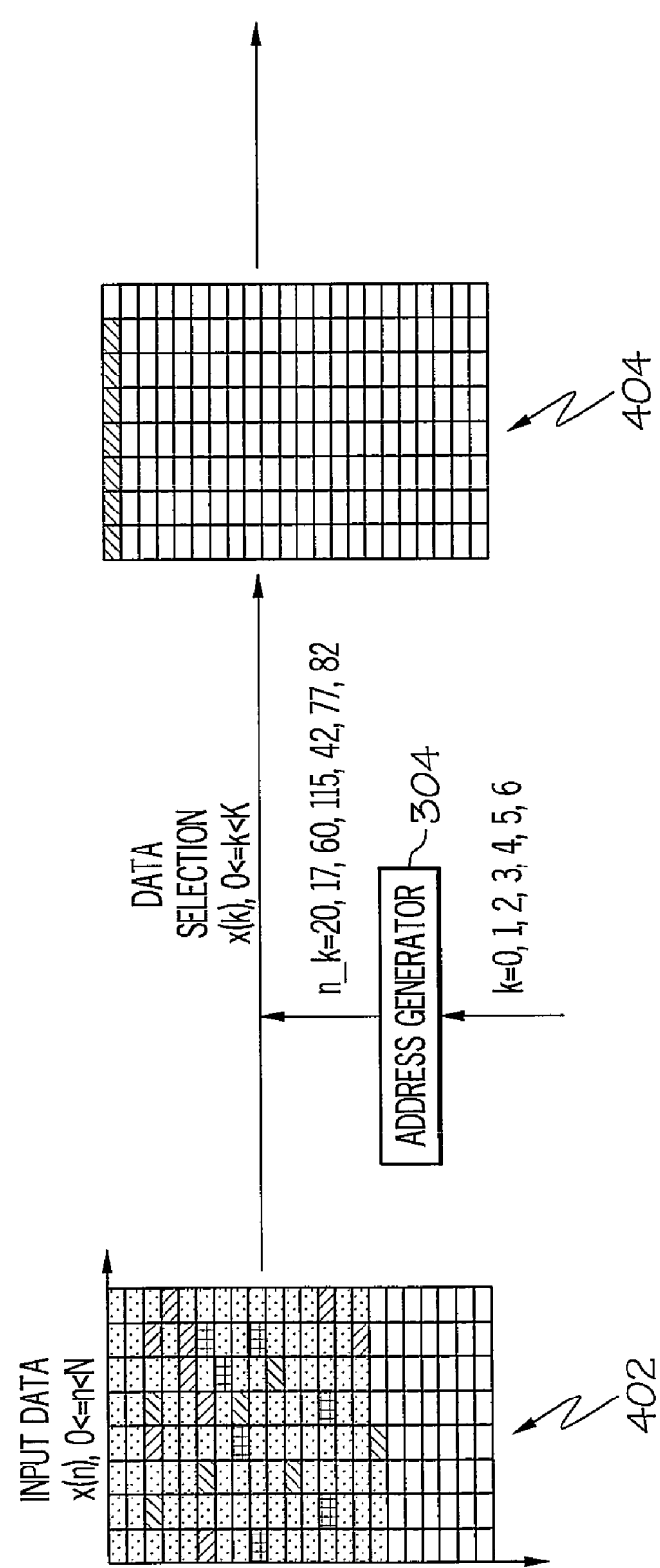
FIG. 4 is an example diagram that depicts deinterleaving by the deinterleaver of FIG. 3, which reads and writes to a control channel region of a memory a single time to deinterleave an associated control channel for a subscriber station (SS), according to an embodiment of the present invention.

With reference to FIG. 3, a relevant portion of a deinterleaver 300, for a long-term evolution (LTE) compliant system that is configured according to an embodiment of the present disclosure, is illustrated. The deinterleaver 300 may, for example, be implemented within a memory controller associated with a memory subsystem. As is shown the deinterleaver 300 includes an address generator 304 that generates addresses such that time-domain deinterleaving and sub-block deinterleaving of an associated control channel may be performed by a data selector 302 using a single read from a control channel region of a memory and a single write to a buffer (e.g., a selected portion of the memory or another memory). More specifically, in at least one embodiment the generator 304 serially provides addresses for CCEs of an associated control channel to the data selector 302, which reads the CCEs in a desired order from the control channel region of the memory and writes the CCEs to a buffer. With reference to FIG. 4, a diagram 400 depicts a control channel region of a memory during a deinterleaving process according to the present disclosure. As is shown the address generator 304 provides addresses (n_k=20, 17, 60, 115, 42, 77, 82) to the data selector 302 such that time-domain deinterleaving and sub-block deinterleaving are performed using a single read (of a control channel region of a memory) and a single write (to a buffer) for each CCE of a control channel associated with an SS.

It should be appreciated that a control channel region of a memory may include one or more control channel symbols each of which includes a number of CCEs, each of which include a number of subcarriers (e.g., four subcarriers). It should be appreciated that the CCEs and resource blocks (RBs) or data elements may have the same size or a different size. It should also be appreciated that the techniques disclosed herein are broadly applicable to downlink (DL) subframes of varying sizes and that a size of a control channel may occupy an integer value of symbols (e.g., 1, 2, 3, etc. symbols) or a fractional value of symbols (e.g., 1.5, 2.5, etc. symbols). Transmitters implemented within a wireless communication system, configured according to various embodiments of the present disclosure, may transmit information using a phase shift keying (PSK), a quadrature amplitude modulation (QAM), or other data modulation scheme, depending upon which modulation scheme is scheduled. For example, any of the various PSK (such as pi/2 BPSK, QPSK, and 8-PSK), or QAM (such as 16-QAM and 64-QAM) modulation techniques may be implemented. Moreover, it is contemplated that the techniques disclosed herein are applicable to a wide variety of communication systems.

The control channel symbols may be, for example, orthogonal frequency division multiplexing (OFDM) signals. An associated control channel, for an SS, may include one or more CCEs. The associated control channel may be a downlink scheduling control channel, an uplink scheduling control channel, or a combined control channel that includes both uplink scheduling and downlink scheduling information. Typically, an uplink scheduling control channel includes an uplink subcarrier (or resource block) assignment, a modulation and coding assignment, a transmit power adjustment, etc. Similarly, a downlink scheduling control channel includes a downlink subcarrier (or resource block) assignment, a modulation and coding assignment, etc.

According to one embodiment of the present disclosure, a technique for extracting a control channel from a received signal includes storing interleaved control channel elements (CCEs) of the received signal in a control channel region of a memory, First addresses for first elements that are included in a first control channel are then generated using a first circuit (e.g., an address generator). Finally, the respective first elements are read, using a second circuit (e.g., a data selector) from the control channel region of the memory according to the generated first addresses to provide the first control channel in a deinterleaved form.

According to another embodiment of the present disclosure, a deinterleaver for extracting a control channel from a received signal includes an address generator and a data selector (which may, for example, be included in a memory controller). The address generator is configured to generate first addresses for first elements that are included in a first control channel. The data selector is coupled to the address generator and is configured to read the respective first elements from a control channel region of a memory, that includes interleaved control channel elements of the received signal, according to the generated first addresses to provide the first control channel in a deinterleaved form.

According to another aspect of the present disclosure, a wireless communication device includes a memory, an address generator, and a data selector (which may, for example, be included in a memory controller). The memory is configured to store interleaved control channel elements of a received signal in a control channel region of the memory. The address generator is configured to generate first addresses for first elements that are included in a first control channel. The data selector is coupled to the address generator and the memory and is configured to read the respective first elements from the control channel region of the memory according to the generated first addresses to provide the first control channel in a deinterleaved form.

Figure 5:
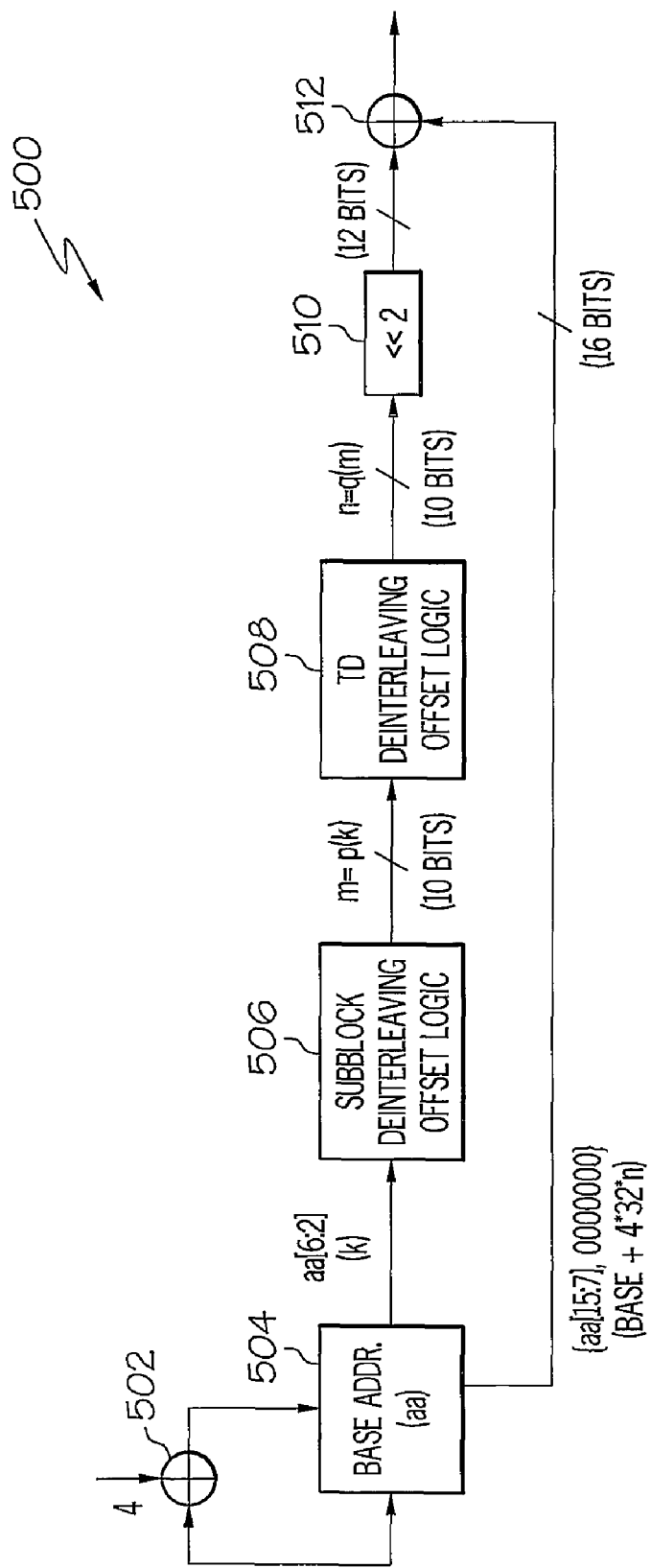
FIG. 5 is an example diagram of a relevant portion of an address generator that generates addresses for performing sub-block and time-domain deinterleaving of control channel elements CCES) stored in a control channel region of a memory to select an associated control channel for an SS, according to an embodiment of the present invention.

With reference to FIG. 5, an example address generator 500, which is configured to generate addresses for deinterleaving control channel elements (CCEs) of a control channel at an SS, is depicted. The generator 500, which may be implemented within a memory controller, provides one example of how the generator 304 of FIG. 3 may be implemented. The generator 500 includes an adder 502 that is configured to increment a base address register 504 by a predefined value (e.g., four (4)), which corresponds to the number of samples in a CCE. Selected lower bits of a base address (in this case bits aa[6:2]) provided by the base address register 504 are provided to sub-block deinterleaving offset logic 506, which performs addressing for sub-block deinterleaving. The address provided by the logic 506 is provided to a time-domain (TD) deinterleaving offset logic 508, which performs addressing for TD interleaving. The address provided by the logic 508 is provided to shift left logic 510, which shifts the address provided by the logic 510 two bits to the left. An address provided by the logic 510 is provided to a first input of an adder 512, whose second input receives upper bits (in this case aa[15:7]) of the base address. An output of the adder 512 provides the address of an associated CCE in the control channel region of the memory.

Figure 6:
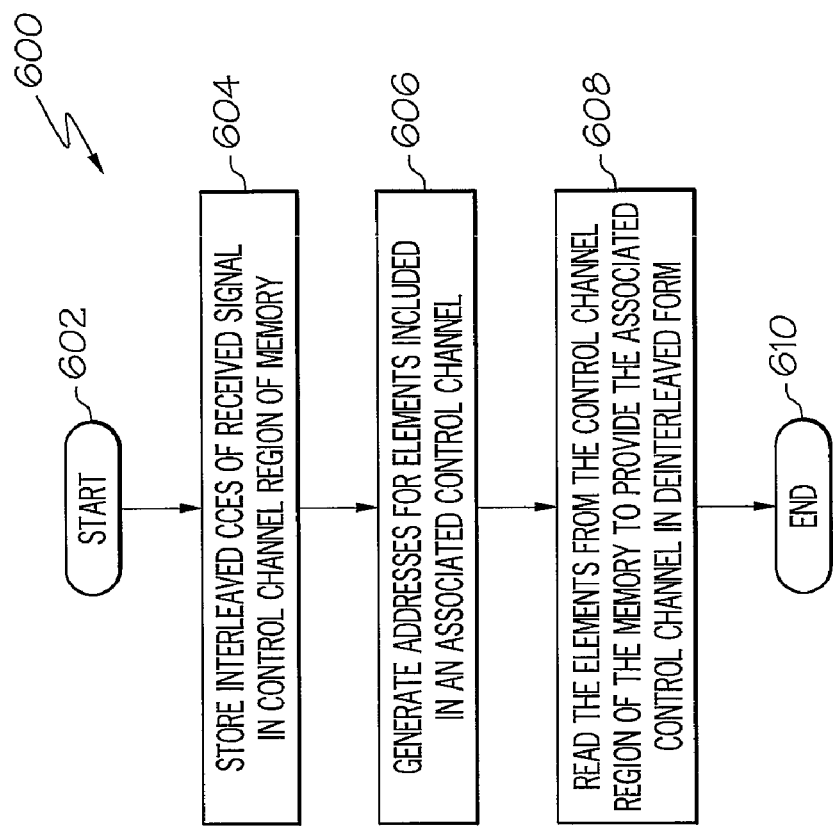
FIG. 6 is a flowchart of a process for generating addresses for performing sub-block and time-domain deinterleaving of CCEs stored in a control channel region of a memory to select an associated control channel for an SS, according to one aspect of the present invention.

Moving to FIG. 6, an example deinterleaving process 600 for generating addresses for deinterleaving CCEs of a control channel is depicted. The process 600 is initiated in block 602, at which point control transfers to block 604. In block 604, interleaved CCEs of a received signal are stored in a control channel region of a memory. Next, in block 606, addresses are generated for CCEs included in a control channel associated with an SS. For example, as noted above, LTE control channel deinterleaving is accomplished by implementing an address generator that includes: sub-block deinterleaving logic that performs the function m=p(k)=n+Q(c)R−f(c,T); and time-domain (TD) deinterleaving logic that performs the function I=q(m)=(mod(m,CFI)>1)*n0+(mod(m,CFI)>2)*n1+floor (m/CFI).

As is also noted above, the disclosed deinterleaving techniques facilitate programmable control of a desired output region (data selection) and are efficient as address generation is performed by an address generator (see, for example, the address generator 500 of FIG. 5) that is efficient and relatively straight forward to implement. Then, in block 608, the CCEs associated with the control channel of the SS are read from the control channel region of the memory to provide the associated control channel in deinterleaved form for decoding. Following block 608, the process terminates in block 610, at which point control returns to a calling routine until a next control channel is received.

Figure 7:
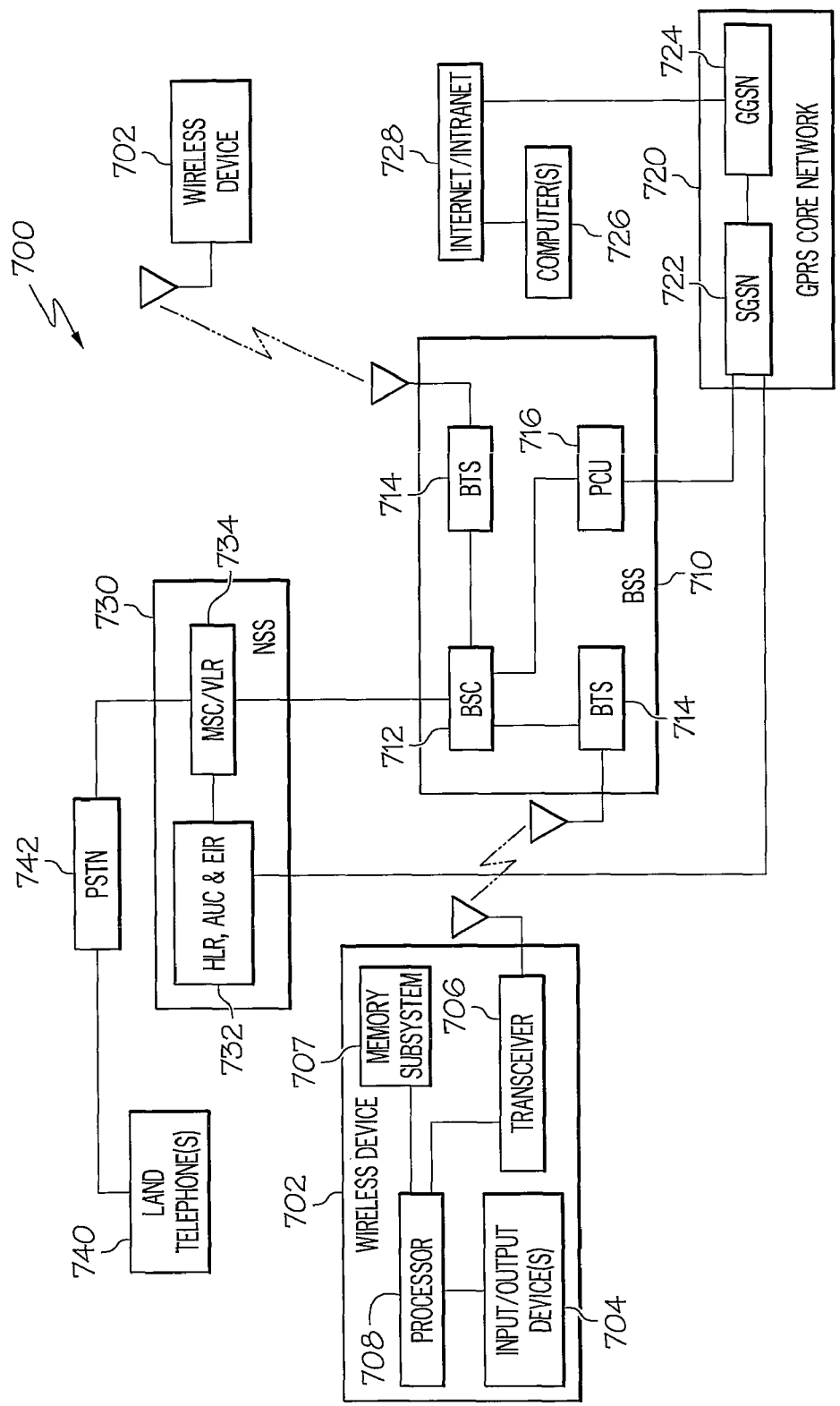
FIG. 7 is a block diagram of an example wireless communication system that may be configured to perform sub-block and time-domain deinterleaving of CCEs stored in a control channel region of a memory to select associated control channels for SSs according to various embodiments of the present invention.

With reference to FIG. 7, an example wireless communication system 700 is depicted that includes a plurality of wireless devices (subscriber stations) 702, e.g., hand-held computers, personal digital assistants (PDAs), cellular telephones, etc., that may deinterleave received control channel symbols according to one or more embodiments of the present disclosure. In general, the wireless devices 702 include a processor 708 (e.g., a digital signal processor (DSP)), a transceiver 706, one or more input/output devices 704 (e.g., a camera, a keypad, display, etc.), and a memory subsystem 707 (which includes a memory controller and an application appropriate amount of volatile and/or non-volatile memory), among other components not shown in FIG. 7. For example, the memory controller (included in the memory subsystem 707) may implement the address generator 500 of FIG. 5 and the process 600 of FIG. 6. As is noted above, according to various embodiments of the present disclosure, techniques are disclosed that facilitate improved control channel acquisition for a wireless communication device, such as the wireless devices 702. The wireless devices 702 communicate with a base station controller (BSC) 712 of a base station subsystem (BSS) 710, via one or more base transceiver stations (BTS) 714, to receive or transmit voice, data, or both voice and data. The BSC 712 may, for example, be configured to schedule communications for the wireless devices 702. Alternatively, the BTS 714 may schedule communications for the wireless devices 702 in which the BTS 714 is in communication.

The BSC 712 is also in communication with a packet control unit (PCU) 716, which is in communication with a serving general packet radio service (GPRS) support node (SGSN) 722. The SGSN 722 is in communication with a gateway GPRS support node (GGSN) 724, both of which are included within a GPRS core network 720. The GGSN 724 provides access to computer(s) 726 coupled to Internet/Intranet 728. In this manner, the wireless devices 702 may receive data from and/or transmit data to computers coupled to the Internet/Intranet 728. For example, when the devices 702 include a camera, images may be transferred to a computer 726 coupled to the Internet/Intranet 728 or to another one of the devices 702. The BSC 712 is also in communication with a mobile switching center/visitor location register (MSCN-VLR) 734, which is in communication with a home location register (HLR), an authentication center GAUC), and an equipment identity register (EIR) 732. In a typical implementation, the MSC/VLR 734 and the HLR, AUC, and EIR 732 are located within a network and switching subsystem (NSS) 730, which may also perform scheduling for the system 700. The SGSN 722 may communicate directly with the HLR, AUC and EIR 732. As is also shown, the MSC/VLR 734 is in communication with a public switched telephone network (PSTN) 742, which facilitates communication between wireless devices 702 and land telephones 740. It should be appreciated that other types of wireless systems, having different configurations, may implement various aspects of the control channel scheduling techniques disclosed herein.

Accordingly, a number of techniques have been disclosed herein that generally improve control channel acquisition by subscriber stations in a wireless communication system.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. For example, the control channel extraction techniques disclosed herein are generally broadly applicable to wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for extracting a control channel from a received signal, comprising:
    storing interleaved control channel elements of the received signal in a control channel region of a memory;
    generating, using a first circuit, first addresses for first elements that are included in a first control channel; and
    reading, using a second circuit, the respective first elements from the control channel region of the memory according to the generated first addresses to provide the first control channel in a deinterleaved form, wherein the interleaved control channel elements are time-domain interleaved and sub-block interleaved and time-domain deinterleaving and sub-block deinterleaving are performed using a single read and a single write for each of the respective first elements in the first control channel.

2. The method of claim 1, further comprising:
    storing the first elements in a first contiguous area of the memory or another memory;
    generating, using the first circuit, second addresses for second elements that are included in a second control channel; and
    reading, using the second circuit, the respective second elements from the memory according to the generated second addresses to provide a second control channel in a deinterleaved form.

3. The method of claim 1, wherein sub-block interleaving of the interleaved control channel elements is accomplished by:
    grouping control channel elements for multiple users into N quadruples;
    writing the N quadruples into a matrix; and
    randomly permuting columns of the matrix according to a predetermined random index sequence.

4. The method of claim 1, wherein the first circuit is an address generator that is included in a memory controller.

5. The method of claim 4, wherein the address generator includes:
    an accumulator that self-increments a base address each cycle;
    offset calculation logic that includes two look-up tables that are indexed by an output of the accumulator and one multiple-add operator;
    bit shift left logic that transforms a control channel element offset into a sample offset; and
    an adder that adds the sample offset to the base address.

6. The method of claim 1, wherein the control channel includes a downlink assignment and an uplink assignment.

7. A deinterleaver for extracting a control channel from a received signal, comprising:
    an address generator configured to generate first addresses for first elements that are included in a first control channel; and
    a data selector coupled to the address generator, wherein the data selector is configured to read the respective first elements from a control channel region of a memory, that includes interleaved control channel elements of a received signal, according to the generated first addresses to provide the first control channel in a deinterleaved form, wherein the interleaved control channel elements are time-domain interleaved and sub-block interleaved and time-domain deinterleaving and sub-block deinterleaving are performed using a single read and a single write for each of the respective first elements in the first control channel.

8. The deinterleaver of claim 7, wherein the data selector is further configured to store the first elements in a first contiguous area of the memory or another memory, and wherein the address generator is further configured to generate second addresses for second elements that are included in a second control channel, where the data selector is further configured to read the respective second elements from the memory according to the generated second addresses to provide a second control channel in a deinterleaved form.

9. The deinterleaver of claim 7, wherein the address generator includes sub-block deinterleaving logic that performs the function $p(k)=n+Q(c)R-f(c,T)$, where $n=floor((k+T)/32)$ is a row index of a matrix, $Q(c)$ is a first look-up table, $f(c,T)$ is a second look-up table, $c=mod(k+T,32)$ is a column index of the matrix, $T=32-mod(N,32)$ is a size of null padding, N is a total number of control channel elements, $R=ceiling(N/32)$ is the total number of rows in the matrix, and $k=0,1,\ldots N-1$ is an index of a desired sample.

10. The deinterleaver of claim 9, wherein the address generator further includes:
    time-domain deinterleaving logic that performs the function $q(m)=(mod(m,CFI)>1)* n0+(mod(m,CFI)>2)* n1+floor(m/CFI)$, where I is an offset location of a $k^{th}$ desired sample, a control format indicator (CFI) provides a number of physical downlink control channel symbols, and n0 and n1 are the number of control channel elements in first and second symbols, respectively;
    offset shift left logic that transforms a control channel element offset into a sample offset; and
    an adder that adds an offset of a selected sample to a base address.

11. The deinterleaver of claim 7, wherein the address generator includes:
    an accumulator that self-increments a base address each cycle;
    offset calculation logic that includes two look-up tables that are indexed by an output of the accumulator and one multiple-add operator;
    bit shift left logic that transforms a control channel element offset into a sample offset; and
    an adder that adds the sample offset to the base address.

12. The deinterleaver of claim 7, wherein the control channel includes a downlink assignment and an uplink assignment.

13. A wireless communication device, comprising:
    a memory configured to stored interleaved control channel elements of a received signal in a control channel region of the memory;
    an address generator configured to generate first addresses for first elements that are included in a first control channel; and
    a data selector coupled to the address generator and the memory, wherein the data selector is configured to read the respective first elements from the control channel region of the memory according to the generated first addresses to provide the first control channel in a deinterleaved form, wherein the interleaved control channel elements are time-domain interleaved and sub-block interleaved and time-domain deinterleaving and sub-block deinterleaving are performed using a single read and a single write for each of the respective first elements in the first control channel.

14. The wireless communication device of claim 13, wherein the data selector is further configured to store the first elements in a first contiguous area of the memory or another memory, and wherein the address generator is further configured to generate second addresses for second elements that are included in a second control channel, where the data selector is further configured to read the respective second elements from the memory according to the generated second addresses to provide a second control channel in a deinterleaved form.

15. The wireless communication device of claim 13, wherein the address generator includes sub-block deinterleaving logic that performs the function $p(k)=n+Q(c)R-f(c,T)$, where $n=\text{floor}((k+T)/32)$ is a row index of a matrix, $Q(c)$ is a first look-up table, $f(c,T)$ is a second look-up table, $c=\text{mod}(k+T,32)$ is a column index of the matrix, $T=32-\text{mod}(N,32)$ is a size of null padding, N is a total number of control channel elements, $R=\text{ceiling}(N/32)$ is the total number of rows in the matrix, and $k=0,1,\ldots N-1$ is an index of a desired sample.

16. The wireless communication device of claim 15, wherein the address generator further includes:
time-domain deinterleaving logic that performs the function $q(m)=(\text{mod}(m,CFI)>1)* n0+(\text{mod}(m,CFI)>2)* n1+\text{floor}(m/CFI)$, where I is an offset location of a $k^{th}$ desired sample, a control format indicator (CFI) provides a number of physical downlink control channel symbols, and n0 and n1 are the number of control channel elements in first and second symbols, respectively;
offset shift left logic that transforms a control channel element offset into a sample offset; and
an adder that adds an offset of a selected sample to a base address.

17. The wireless communication device of claim 15, wherein the control channel includes a downlink assignment and an uplink assignment for the wireless communication device.

* * * * *